Figure 1:
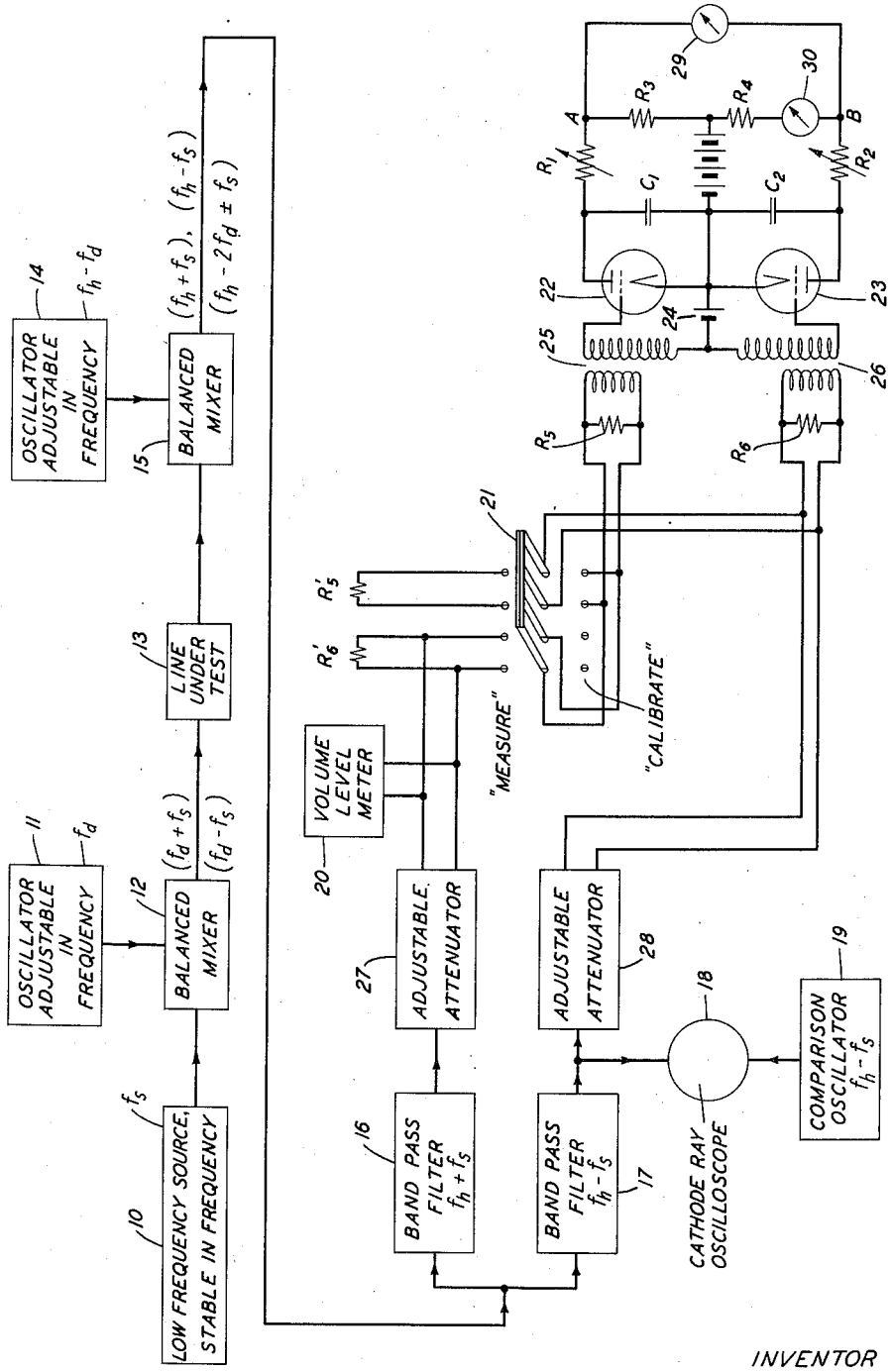

Nov. 5, 1957  K. W. PFLEGER  2,812,492
DIFFERENTIAL LOSS MEASURING SYSTEM
Filed Aug. 28, 1953  2 Sheets-Sheet 1

INVENTOR
K. W. PFLEGER
BY
Franklin Mohr
ATTORNEY

Nov. 5, 1957  K. W. PFLEGER  2,812,492
DIFFERENTIAL LOSS MEASURING SYSTEM
Filed Aug. 28, 1953

INVENTOR
K. W. PFLEGER
BY
Franklin Mohr
ATTORNEY

United States Patent Office 2,812,492
Patented Nov. 5, 1957

2,812,492
DIFFERENTIAL LOSS MEASURING SYSTEM

Kenneth W. Pfleger, Arlington, N. J., assignor to Bell Telephone Laboratories, Incorporated, New York, N. Y., a corporation of New York Application August 28, 1953, Serial No. 377,221

7 Claims. (Cl. 324—57)

This invention relates to measuring systems and more particularly to differential loss measuring systems, that is, for measuring the rate of change of loss with respect to frequency. Measurement of differential loss is useful in the testing and maintenance of television and telephotograph circuits and elsewhere, particularly where echo currents are present in a transmission line, and for other purposes.

In television transmission the picture is impaired when one or more echoes on the line cause one or more weak duplicates of the picture to appear on the viewing screen, each superimposed on the latter with a lateral displacement proportional to the delay difference between the echo and the direct transmission. In testing a line for use in television one observes a sinusoidal ripple in the loss vs. frequency characteristic and another in the envelope delay vs. frequency characteristic, both due to a single echo. It is necessary to place tolerance limits upon the permissible echoes in a practical system. When the echo's relative delay has a large absolute value, the tolerance is imposed merely upon the amplitude of the echo, which is proportional to the amplitude of the ripple in the loss characteristic. When the echo's relative delay has a small absolute value the impairment caused by an echo of fixed amplitude varies with the spacing; and a fixed tolerance can be placed upon the envelope delay distortion and similarly upon the slope of the loss vs. frequency characteristic. Because of the latter tolerance particularly it is useful to measure $d\alpha/d\omega$ where $\alpha$ is the loss in nepers and $\omega$ is $2\pi$ times the frequency. When pairs of echoes arise they can sometimes produce ripples in the loss characteristic without any in the delay characteristic, or vice versa. When ripples occur only in the loss characteristic, the importance of measuring $d\alpha/d\omega$ is obvious.

It is an object of this invention to accomplish such measurements of $d\alpha/d\omega$ with facility and accuracy.

In accordance with the invention, two waves differing in frequency by a relatively small known frequency interval are provided. These waves are sent over the transmission path to be measured and at the receiving end they are separated out on a frequency basis and individually detected. The amplitudes of the detected waves are compared to provide a measure of $d\alpha/d\omega$, the rate of change of loss with respect to $2\pi$ times the mean frequency of the two waves.

One measuring arrangement disclosed herein is suitable for use on a straightaway basis between stations at two locations without any auxiliary line except for a return order wire or communication path between operators at the two ends of the line when the ends are remote from each other. Another arrangement automatically records the value $d\alpha/d\omega$ graphically and uses an auxiliary return line when making straightaway measurements.

Figure 2:
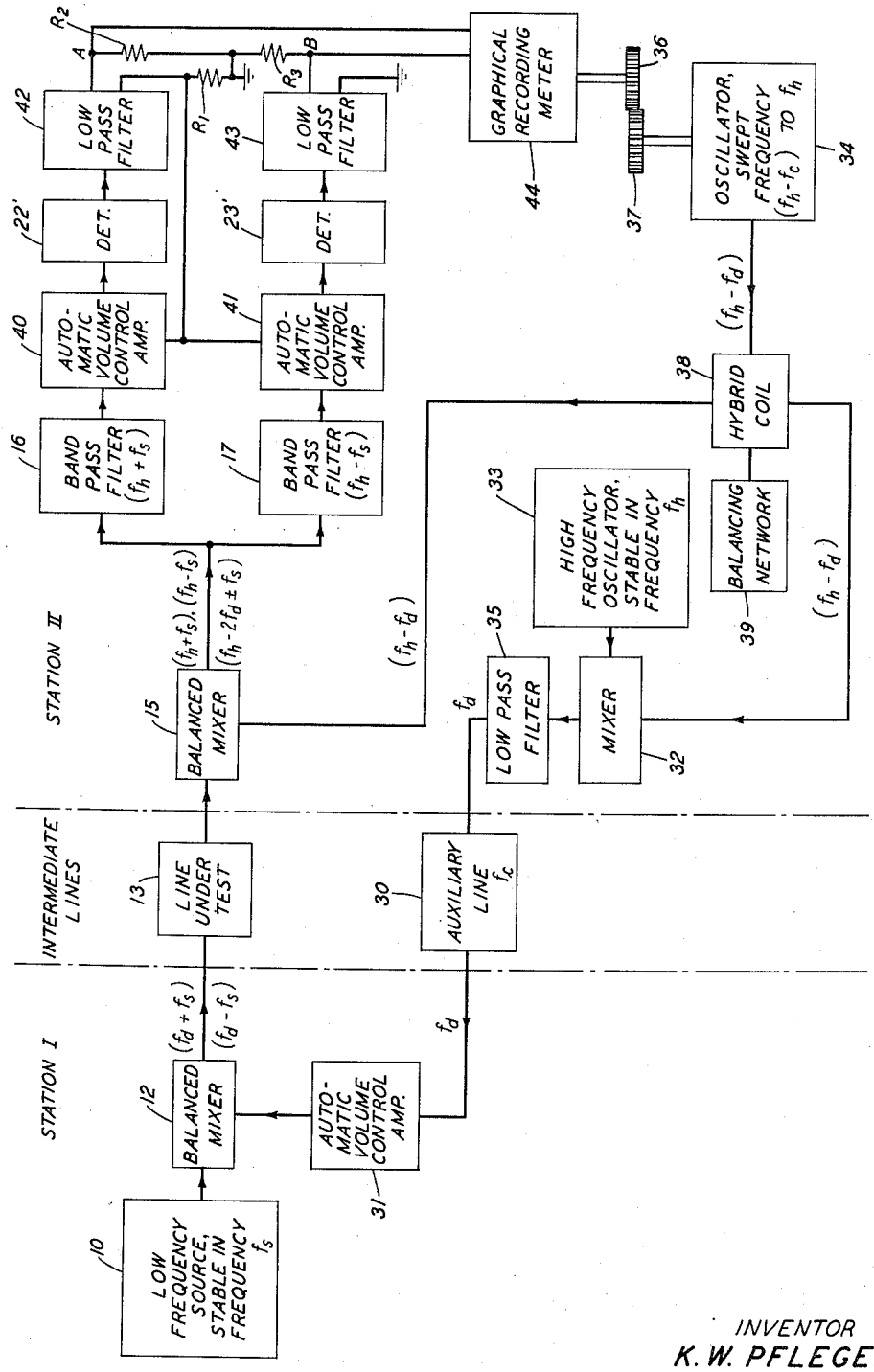

In the drawings,

Fig. 1 is a schematic diagram, partly composed of blocks and single line connecting paths, and partly showing double line connections, for a measuring system in accordance with the invention; and Fig. 2 is a single line block schematic diagram for another measuring system also in accordance with the invention and involving a recorder.

In the arrangement of Fig. 1, the sending apparatus includes a stable and accurate source 10 of sinusoidal, usually relatively low frequency $f_s$, for instance 4 kilocycles for a television circuit or 25 cycles per second for a telephotograph circuit. The oscillator 10 together with an oscillator 11 of sinusoidal adjustable frequency $f_d$, covering the television range, telephotograph or other range, is connected to a balanced mixer 12. Due to the mixer being balanced, the frequencies $f_s$ and $f_d$ and harmonics thereof appearing in its output are negligible, and the only appreciable output components are frequencies $(f_d+f_s)$ and $(f_d-f_s)$.

The components should have equal amplitudes as they are sent over the line 13, under test. At the receiving end of the line these frequencies are shifted by modulation with an adjustable high frequency $(f_h-f_d)$ from a local oscillator 14 in another balanced mixer 15 giving rise only to sum and difference frequencies at the mixer output. These output frequencies are $(f_h-2f_d-f_s)$, $(f_h-2f_d+f_s)$, $(f_h-f_s)$, and $(f_h+f_s)$. The first two of these four frequencies are not used. The latter two frequencies are chosen to be always at the midband respectively of the similarly labeled narrow band pass filters 16 and 17, which should not appreciably pass any frequency other than that with which they are designated. In order to verify the frequency passing the filter 17, say, the output of the filter may be connected to either the vertical or the horizontal plates of a cathode ray oscilloscope 18 and an accurately known frequency of the same value may be connected to the other pair of plates from a calibrated comparison oscillator 19 so that a stationary image results on the cathode ray tube when the frequency of oscillator 14 is correctly adjusted. At the same time current should be found at the output of the other narrow band filter as may be checked, for example, by connecting a volume level meter 20 beyond the filter 16.

After the frequency of the variable oscillator 14 has thus been correctly set, a double throw switch 21 is closed in the "Calibrate" position (downward in Fig. 1) so that voltage of frequency $(f_h-f_s)$ is applied in parallel across the inputs of two detectors, shown as triodes 22 and 23. These detectors should have constant input impedances and are preferably alike. A suitable grid bias for both tubes is provided as by a battery 24. The heater circuits for tubes 22 and 23 are not shown but may be energized by alternating current if desired.

Resistors $R_5$ and $R_6$ are provided across the respective primary windings of a pair of input transformers 25 and 26, and resistors $R_5'$ and $R_6'$ across the respective upper pairs of contacts of the switch 21. When the input transformers present sufficiently high impedances as seen looking into their primary windings, $R_5'$ may be equal to $R_5$ and $R_6'$ may be equal to $R_6$ in order that $R_5'$ may be equal to the input impedance associated with the detector tube 22 and $R_6'$ may be equal to the input impedance associated with the detector tube 23.

The main detector loads are respectively resistors $R_3$ and $R_4$. Additional small variable load resistors $R_1$ and $R_2$ are provided to balance the outputs so that zero direct-current voltage exists across terminals A and B when the switch is in the "Calibrate" position. Adjustable attenuators 27 and 28 are provided in order to control the input to the detectors so that they shall operate at an adequate but not a damaging level. A direct-current meter 29 across the terminals A and B will respond, whenever the direct-current voltage across these terminals departs from the balanced condition. A suitable degree of sensitivity in the detectors as well as a balanced condition may be obtained by adjusting the attenuators.

With the detectors' output circuits balanced, the switch is then thrown to the "Measure" position. This puts the impedance $R_5'$ across the input of detector tube 23. Since $R_5'$ is equal to the input impedance of the detector including tube 22, there is no change in the rectified output of tube 23 with either switch position. Attenuator 27 should then be adjusted until the direct-current meter 29 again reads zero.

Assuming that the two band pass filters have been built out to have equal losses at their respective midband frequencies, and that their equal impedances match their respective attenuators, it is obvious that the loss in attenuator 28 minus the loss in attenuator 27 is equal to the difference between the loss of the line at frequency $(f_a+f_s)$ and its loss at frequency $(f_a-f_s)$. This difference in nepers is called $\Delta\alpha$. The value $4\pi f_s$ corresponds to $\Delta\omega$ in radians per second and is assumed to be known. Therefore, $\Delta\alpha/\Delta\omega$ may be computed and is very closely equal to $d\alpha/d\omega$ so that $\Delta\alpha/\Delta\omega$ may be used as the slope of the loss vs. $\omega$ characteristic in nepers per radian per second at the line frequency, $f_a$.

Many commercially available attenuators are calibrated in whole or half decibel steps, and are found to be too coarse for use with the systems herein disclosed. Attenuators may readily be built to give loss calibrated in nepers, and to operate in steps of .01 neper or less for use as the attenuators 27 and 28. The differential direct-current meter 29 should be capable of reading small values of $\Delta\alpha$ with a precision of ±.001 neper or better.

A volume level meter 30 to check the power output of detector tube 23 may be provided in series with the resistance $R_4$.

By making the narrow band pass filters 16 and 17 have equal losses at equal frequency intervals from the midband frequencies, the random or thermal noise power admitted by each filter is about the same, and after detection, the resultant noise is reduced by the differential connection of the detector outputs. Also minor nonselective level variations on the line tend to have no effect for the same reason. Single frequency noise will not lead to error of its presence is recognized. The error due to single frequency noise may be avoided by changing carrier frequency $f_a$ until it is removed from the vicinity of any given single frequency noise by an amount greater than about $2f_s$. When this type of noise is present, low frequency beats generally occur in the detector output current and will give rise to a meter deflection if an alternating-current meter (not shown) is also connected across terminals A and B, when the direct-current meter 29 reads zero. The detectors should have by-pass condensers $C_1$ and $C_2$ to get rid of high frequencies such as $(f_h+f_s)$ and $(f_h-f_s)$ but not affecting very low frequency beats appreciably.

By making the mixer circuits entirely of resistances the testing equipment introduces no attenuation distortion if the mixers are suitably padded or face resistance terminations in all directions.

It is possible to replace the fixed comparison oscillator 19 by an harmonic generator activated by the frequency $2f_s$ which can be obtained by detecting a portion of the signal as received from the line, containing the frequencies $(f_a+f_s)$ and $(f_a-f_s)$.

If there are unwanted frequencies appearing in the output of the mixer 12 at the sending end which cause modulation problems on nonlinear circuits, one may put a band pass filter of bandwidth at least $2f_s$ at the output of mixer 12 to purify the wave and replace the variable oscillator 11 by a fixed frequency source (not shown) of the proper frequency required to correspond to the filter's midband frequency, $f_a$. The two fixed output frequencies thus obtained may then be shifted up or down as desired by means of a signal shifter (i. e., another mixer, not shown) before going out on the line.

In the arrangement of Fig. 2, the sending apparatus at station I is similar to that shown in Fig. 1 except that the variable frequency oscillator 11 is omitted and the frequency $f_a$ is obtained over an auxiliary line 30 from the receiving end. Its level is maintained constant by an automatic volume control amplifier 31 at the sending end.

The frequency $f_a$ is obtained at the receiving end by beating together in a mixer 32 an accurate fixed high frequency $f_h$ from an oscillator 33 and a variable high frequency $(f_h-f_a)$, from a swept frequency oscillator 34 and by selecting one sideband by means of a filter 35, which may be a low pass filter.

The variable condenser or other tuning element of the oscillator 34 is motor driven by reduction gears (not shown) causing $f_a$ to cover the complete measuring range as slowly as desired, and continuously. This oscillator's output is divided into two independent branches as by a hybrid coil 38 having a balancing network 39. One branch feeds into the mixer 15 of the receiver in location II. This mixer and the narrow band pass filters 16 and 17 are similar to those previously described. Therefore, the outputs of these filters are respectively $(f_h+f_s)$ and $(f_h-f_s)$. These two frequencies respectively are amplified and rectified in separate automatic volume control amplifiers 40, 41 and detectors 22' and 23', and the direct-current components are filtered off by low pass filters 42 and 43. These direct-current components flow over load resistors $R_2$ and $R_3$ respectively to ground. These resistors are adjusted so that when equal amplitudes of $(f_a-f_s)$ and $(f_a+f_s)$ are received from the line, the direct-current potential across terminals A and B is zero. A portion of the direct-current output from low pass filter 42 flows over a resistor $R_1$ to produce a control voltage for the automatic volume control amplifiers 40 and 41. Their gains are both adjusted to vary equally under control of the received amplitude of $(f_h+f_s)$, and it is assumed that the feedback circuit involved is designed to be substantially free from hunting.

When frequencies $(f_a-f_s)$ and $(f_a+f_s)$ have unequal amplitudes the direct-current voltage across terminals A and B is in proportion to the difference between these line frequencies' amplitudes. A graphical recording meter 44 which records this difference can be calibrated in units of $d\alpha/d\omega$. The calibration holds in spite of minor nonselective level variations on the line because of the two automatic volume controls 40 and 41.

The graphical recording meter's paper moves in accordance with the average line frequency, $f_a$, due to the gear train 36, 37 or other mechanical drive from the same motor (not shown) as turns the variable oscillator 34, in much the same manner as graphical recording meters which are used in making loss vs. frequency characteristics in the telephone plant and elsewhere.

The discussion with reference to the arrangement of Fig. 1 relating to noise also applies to the arrangement of Fig. 2. Due to the fact that the line current is the same and $d\omega$ may be made the same as in certain sets for measuring envelope delay, $d\beta/d\omega$, it is feasible and convenient to combine the receivers used when delay is measured and those used in the arrangements herein so that one may obtain both $d\alpha/d\omega$ and $d\beta/d\omega$ at the same time. The delay set receiver and the $d\alpha/d\omega$ set receiver can both receive current from the line and neither receiver will affect the other if separation is obtained by means of a resistance hybrid coil, or other known devices for obtaining branch circuits with a minimum of interaction.

A method of measuring envelope delay distortion is disclosed in my copending application Serial No. 222,832, filed April 25, 1951, which matured into Patent 2,700,133, granted January 18, 1955, wherein the testing current is sent onto the line by time division, reference frequency pulses and variable frequency pulses being separated by intervals of zero current at the sending end and the pulses being separately received in narrow band pass filters at the receiving end. In each such band pass filter the output spectrum comprises a multiplicity of discrete frequencies separated by dead bands of width corresponding to the repetition rate. It would be possible to select two of these discrete frequencies (preferably spaced equidistant from the carrier) by means of very narrow band pass filters and to compare differentially the rectified outputs of the latter filters in a manner similar to that shown in Fig. 1 or Fig. 2 herein, in order to provide for simultaneous measuring of $d\alpha/d\omega$ and $d\beta/d\omega$. It will be evident that it is immaterial for purposes of measuring $d\alpha/d\omega$ whether the two frequencies $(f_h+f_s)$ and $(f_h-f_s)$ are sent over the line simultaneously or alternately.

Where the sending and receiving ends of the line are at different locations it will generally be necessary to provide facilities whereby personnel at the two ends can communicate while making measurements. Such facilities may involve a separate line or may use the line under test. As such communication facilities are well known they are not shown in the drawings. It will be understood, however, that if an operator's telephone set or other device is connected to the line under test while measurements are being made, the device so connected should be designed not to affect the measurements. For example, a monitoring amplifier of very high input impedance may be bridged across a line, or a resistance hybrid coil may be used to separate the measuring equipment from the communication apparatus while both are connected. As is well known, such connections may produce negligible distorting effects upon the measuring currents.

The invention is susceptible of wide variation and modification without departing from its spirit and scope. It may be applied to radio transmission instead of line wire transmission and is not to be construed as limited to the numerical values that have been given, nor to the precise method of implementation, since these are merely illustrative and are not to be taken as limiting.

What is claimed is:

1. A differential loss measuring system having transmitting and receiving portions between which a transmission path to be measured may be inserted, said system comprising in its transmitting portion a stable frequency source of waves of a frequency equal to one half the desired frequency interval that is to be used in the measurements, a source of waves adjustable in frequency to cover a desired range of measuring frequencies at which differential loss measurements are to be made, and a mixer to which are connected said stable frequency source and said adjustable frequency source to produce two measuring waves differing by the desired frequency interval which are to be sent over the path to be measured, and said system comprising at the receiving end a second source of waves adjustable in frequency to heterodyne said two measuring waves to a predetermined pair of fixed frequencies irrespective of the measuring frequencies, a mixer for heterodyning said measuring waves, to which mixer are connected said second adjustable frequency source and the receiving end of the path to be measured, a pair of frequency selective circuits connected to the output of the last mentioned mixer, said frequency selective circuits passing respectively substantially only said fixed frequencies obtained in the mixer, and means responsive to a difference in the output amplitudes of the waves passed through said respective frequency selective circuits, said means being connected to the outputs of both said circuits.

2. A system in accordance with claim 1, in which the mixers are balanced.

3. In a system according to claim 1, a differential detector having two input circuits each having a given value of input impedance, individual adjustable attenuators connected to the respective outputs of the said frequency selective circuits, an impedance element simulating the input impedance of one of the differential detector inputting circuits, a calibrate-measure switch which in the calibrating position connects the output of one of said adjustable attenuators across both of the input circuits of the differential detector, said switch in the measuring position connecting each said adjustable attenuator to a respective one of the differential detector input circuits and connecting the said impedance element across the differential detector input circuit other than the one which the said impedance element simulates.

4. In a system according to claim 3, individual means to adjust the sensitivity of the two sides of the differential detector.

5. A differential loss measuring system having transmitting and receiving portions between which a transmission path to be measured may be inserted, said system comprising in its transmitting portion a stable frequency source of waves of a frequency equal to one half the desired frequency interval that is to be used in the measurements, an automatic gain control amplifier, and a mixer to which are connected said stable frequency source and said automatic gain control amplifier, and said system comprising at the receiving end a source of waves adjustable in frequency for heterodyning, a mixer to which are connected said heterodyning source and the receiving end of the path to be measured, a pair of frequency selective circuits connected to the output of the last mentioned mixer, said frequency selective circuits passing respectively one of two predetermined fixed frequencies separated by the aforementioned frequency interval, means responsive to a difference in the output amplitudes of waves passed through said respective frequency selective circuits, said means being connected to the outputs of both said circuits, a second stable frequency wave source, a mixer to which are connected said second stable frequency wave source and said heterodyning source, and an auxiliary line between the receiving and transmitting portions of the system connected between the last mentioned mixer and the automatic gain control amplifier at the transmitting portion of the system, the second stable frequency and the heterodyning frequency differing by an interval equal to the desired measuring frequency.

6. A system according to claim 5, in which the means responsive to a difference in the output amplitudes of waves passed through the respective frequency selective circuits comprises a recorder.

7. A system according to claim 6, with mechanical means for adjusting the heterodyning source, while simultaneously moving the recorder over a frequency scale.

References Cited in the file of this patent

UNITED STATES PATENTS

| 1,816,958 | Clark | Aug. 4, 1931 |
| 2,570,912 | Bishop | Oct. 9, 1951 |
| 2,632,792 | Selz | Mar. 24, 1953 |
| 2,685,062 | Schroeder et al. | July 27, 1954 |